(12) United States Patent
Sanderson

(10) Patent No.: US 6,659,495 B1
(45) Date of Patent: Dec. 9, 2003

(54) INSTRUMENT CARRIER

(75) Inventor: David B. Sanderson, Villa Park, CA (US)

(73) Assignee: SKB Corporation, Orange, CA (US)

(*) Notice: Subject to any disclaimer, the term of this patent is extended or adjusted under 35 U.S.C. 154(b) by 40 days.

(21) Appl. No.: 09/990,501

(22) Filed: Nov. 21, 2001

(51) Int. Cl.[7] .............................................. B62B 1/22
(52) U.S. Cl. .................... 280/651; 280/47.35; 280/79.3
(58) Field of Search .............................. 280/651, 47.35, 280/87.03, 79.11, 79.3, 79.7, 79.6, 144, 145; 248/918

(56) References Cited

U.S. PATENT DOCUMENTS

| | | | |
|---|---|---|---|
| 3,311,202 A | 3/1967 | Schell et al. | |
| 3,424,283 A | 1/1969 | Sheldon | |
| 4,165,088 A | * 8/1979 | Nelson | 280/47.35 |
| 4,796,909 A | * 1/1989 | Kirkendall | 280/651 |
| 4,934,720 A | * 6/1990 | Dobron | 280/79.11 |
| 5,115,893 A | * 5/1992 | Terkildsen | 190/11 |
| 5,379,893 A | 1/1995 | Ruiz | |
| 5,399,009 A | 3/1995 | Hiner | |
| 5,424,283 A | 6/1995 | Miano et al. | |
| 5,445,266 A | 8/1995 | Prete et al. | |
| 5,452,951 A | 9/1995 | Peller | |
| 5,484,124 A | 1/1996 | Billings | |
| 5,524,754 A | 6/1996 | Hollingsworth | |
| 5,557,683 A | 9/1996 | Eubanks | |
| 5,607,054 A | 3/1997 | Hollingsworth | |
| 5,666,265 A | 9/1997 | Lutz et al. | |
| 5,879,014 A | * 3/1999 | Price | 280/47.18 |
| 5,887,723 A | 3/1999 | Myles et al. | |
| 5,887,777 A | 3/1999 | Myles et al. | |
| 6,059,384 A | * 5/2000 | Ho | 312/223.2 |
| 6,382,643 B1 | * 5/2002 | Baker | 280/79.11 |
| 6,439,585 B1 | * 8/2002 | Tan | 280/47.26 |
| 6,485,037 B1 | * 11/2002 | Sulcer, Jr. | 280/47.26 |
| 2002/0153682 A1 | * 10/2002 | Gruber | 280/79.11 |

FOREIGN PATENT DOCUMENTS

GB  2224701 A  *  5/1990  .............. B62B/1/14

OTHER PUBLICATIONS

*The Case Street Journal*, Jul. 2000,, vol. 1, Issue 1, (website skbcases.com).

* cited by examiner

Primary Examiner—Brian L. Johnson
Assistant Examiner—J. Allen Shriver
(74) Attorney, Agent, or Firm—Orrick, Herrington & Sutcliffe LLP

(57) ABSTRACT

An electronic or musical instrument carrier for supporting and facilitating transport of such equipment. The carrier comprises a rigid base sufficiently strong and large to support the equipment, and the base preferably has a plurality of casters mounted to the bottom thereof. The top of the base has laminated or otherwise secured thereto a layer of hook and loop fastener material. A plurality of corner cleats, which have a mating hook and loop fastener material secured to the bottom thereof, are provided and can be removably attached on the material which is secured to the base to cradle and resiliently support corners of the electronic equipment. A strap or other device can be provided to secure the electronic equipment onto the base. In an alternative embodiment, a cover for the electronic equipment can be provided and which fits within suitable mating grooves in the top of the base.

15 Claims, 1 Drawing Sheet

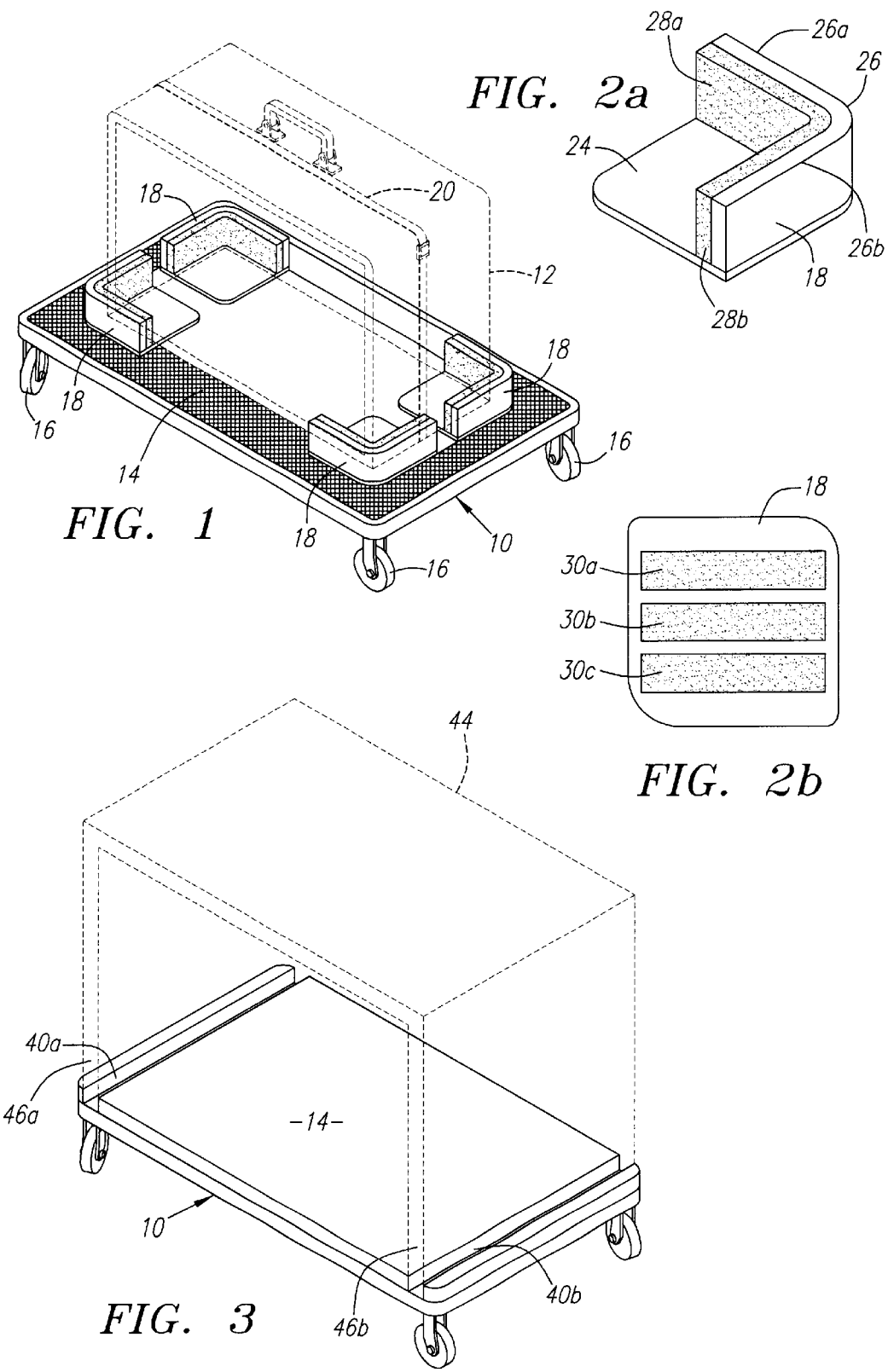

INSTRUMENT CARRIER

The present invention relates to devices for facilitating transport of musical instruments, and more particularly to a relatively simple device for facilitating transport of amplification systems, keyboards, and other electronic equipment and the like.

BACKGROUND OF THE INVENTION

Various forms of devices have been provided for transporting electronic musical equipment, such as various forms of plastic and metal cases, dollies, hand trucks and the like. Particularly popular cases for various forms of musical equipment are manufactured and sold by SKB Corporation, Orange, Calif.

Among the difficult electronic musical items to transport are, among others, existing amplifiers of the vacuum tube type and which, because of the weight of the transformers, chassis, tubes and other components, are quite heavy and bulky. Many musicians and electronic technicians still prefer the sound quality provided by vacuum tube equipment, and numerous such devices are still in use. Equipment of this nature may be transported by hand if the electronic system has a handle or handles and is not too heavy. Frequently, such components are transported on dollies and hand trucks. Obviously, moving these by hand can be a substantial task, and transporting such equipment, which in many instances maybe relatively rare, by a dolly or hand truck may lead to damage to the electronic equipment if it slides off or the like. This type of equipment exists in various sizes and this further complicates transport.

SUMMARY OF THE INVENTION

The present invention provides a relatively simple solution to the transport problem for such electronic equipment. In accordance with an exemplary embodiment of the present invention, a carrier or transport unit comprises a rigid base of any suitable material, such as wood, and which has secured thereto a layer of hook and loop fastener material of the type known under the mark Velcro. A plurality of padded corner cleats which likewise have a hook and loop fastener on the base, are provided. These corner cleats can be placed in suitable locations on the Velcro layer on the base to engage each corner of, and cradle, the electronic equipment, such as an amplifier, which typically is housed in a rectangular case. The base may include a plurality of wheels secured to the bottom or edges to facilitate movement of the carrier and electronic equipment. A suitable strap or other fastening device can be provided to better cinch the electronic equipment to the base. Alternative embodiments include a groove in the upper surface of the base to which a suitable cover can be mated and which covers the electronic equipment.

Accordingly, it is an object of the present invention to provide an improved device for transporting or carrying musical and other electronic equipment or gear.

Another object of the present invention is to provide a relatively simple carrier for electronic equipment comprising a flat base having a hook and loop fastener secured or laminated thereon, and to which suitable corner cleats can be readily attached and adjusted to cradle and support the electronic gear.

BRIEF DESCRIPTION OF THE DRAWINGS

These and other objects and features of the present invention will become better understood through a consideration of the following description taken in conjunction with the drawings in which:

FIG. 1 is a perspective view of a carrier according to the present invention having an electronic amplifier disposed thereon;

FIGS. 2a and 2b are views of a corner cleat which can be used for cradling the corners of the electronic equipment; and FIG. 3 illustrates an alternative modification to the carrier and a cover attachable thereto for covering the electronic equipment.

DETAILED DESCRIPTION

Turning now to the drawings, and first to FIG. 1, an exemplary embodiment of an electronic equipment or instrument carrier is illustrated and which comprises a rectangular base 10 of suitable material and thickness for supporting and transporting a piece of electronic equipment 12 (shown in phantom lines), such as a musical power amplifier or the like. The base 10 may be formed of wood, metal, or any other suitable material. The base has laminated or otherwise secured on top thereof a layer of hook and fastener material 14 known under the mark Velcro. Preferably, four locking casters 16 of known type (only three being seen in FIG. 1) are provided attached to the bottom of the base 10 at the four corners of the base. These facilitate rolling of the carrier with the electronic equipment, and their locking feature allows the casters to be locked to secure the assembly once it has been placed in a suitable location.

Four corner cleats 18 (only three being seen in FIG. 1) are disposed and removably secured on the fastener material 14 at the four corners of the electronic equipment 12. Each of these cleats, as will be noted in the discussion of FIG. 2, is in the shape of a corner, along with a base, the bottom surface of which has a mating hook and loop fastener. In this way, the corner cleats 18 can be secured in four suitable locations on the fastener 14 on the base 10 to "cradle" the corners of the electronic equipment 12. The cleats 18 can be removed and placed in other locations on the material 14 to accommodate different size equipment 12. Additionally, a suitable hold down strap 20 can be provided and secured to the base 10 on either side of the electronic equipment 12 to help secure and retain the equipment 12 on the base 10.

Turning now to FIG. 2, an exemplary corner cleat 18 is shown in greater detail. The same includes a relatively flat base 24, having an upstanding corner section 26 comprising perpendicular sections 26a and 26b which either may be suitably attached to the edges of the base 24 or molded integrally therewith. In addition, sections 28a and 28b of resilient material or padding are adhered to the respective sections 26a and 26b by a suitable adhesive or the like. These resilient sections 28 serve to pad the lower corners of the electronic equipment 12.

The bottom 24 (FIG. 2b) of the corner cleat 18 preferably has one or more sections 30a–c secured thereto as by an adhesive or the like to mate with and hook to the material 14 secured to the base 10. This arrangement allows the corner cleats (preferably 4) to be placed at locations on the material 14 to accommodate a wide variety of sizes of electronic equipment 12.

An alternative construction for the base 10 is illustrated in FIG. 3. In some instances, it may be desired to provide a detachable cover for covering the electronic equipment 12. In the embodiment shown in FIG. 3, the base 10 is modified to receive a U-shaped cover 44. In particular, two grooves 40a and 40b are provided along the left and right edges of the base 10, and the hook and loop fastener 14 is disposed between these grooves. These grooves 40a–40b are dimensioned so that the U-shaped cover 44 can be disposed over the electronic equipment 12 (not shown in FIG. 3) with the legs 46a–46b resting in the respective grooves 40a–40b of the base 10. The strap 20 (FIG. 1) or other suitable device can be applied over the cover 44 to retain it and the electronic gear 12 in place during transport. In the event it is desired to cover all four sides of the electronic gear 12, the base can have four grooves, the two 40a–40b on the sides, and two more on the front and back sides of the fastener material 14. The cover 44 in this case has four sides or legs which mate with the four grooves.

Although the present concepts have been shown and described in connection with a carrier for musical amplifiers and the like, the concepts are equally applicable to musical keyboards, and other electronic gear which may be needed to be transported by a rolling-type carrier of the nature described herein.

While embodiments of the present invention have been shown and described, various modifications may be made without departing from the scope of the present invention, and all such modifications and equivalents are intended to be covered.

What is claimed is:

1. An electronic equipment carrier comprising
    a rigid flat base, the base having a thickness and size sufficient for supporting a piece of electronic equipment,
    the base having a plurality of casters attached thereto for allowing the base to be easily rolled,
    a layer of hook and loop fastener material secured to an upper surface of the base thereby forming a flat surface of the material, and
    a plurality of corner cleats removably attachable to the hook and loop fastener material at locations thereon to cradle and support corners of electronic equipment, each of the corner cleats including a base having mating hook and loop fastener material on the bottom thereof for hooking with the hook and loop fastener material attached to the upper surface of the base, each corner cleat further including upstanding sections perpendicular to each other, along with resilient material thereon, for mating with and cushioning corners of electronic equipment to be disposed on the carrier.

2. An electronic equipment carrier as in claim 1 including a support strap attached to the base for extending over electronic equipment thereon for securing the same to the base.

3. An electronic equipment carrier as in claim 1 wherein the base includes at least a pair of grooves in an upper surface thereof for mating with and receiving an associated cover for covering electronic equipment to be disposed on the base.

4. An electronic equipment carrier as in claim 3 wherein the base has four grooves for mating with the cover.

5. An electronic equipment carrier as in claim 1 wherein the casters are locking type casters, and the corner cleats comprise four cleats.

6. A carrier for electronic amplifiers of different size comprising
    a rigid flat base having a thickness and size sufficient for supporting an amplifier,
    the base having a plurality of casters attached thereto for allowing the base to be easily rolled,
    a layer of hook and loop fastener material secured to an upper surface of the base thereby forming a flat surface of the material, and
    a plurality of corner cleats removably attachable to the hook and loop fastener material at locations thereon to cradle and support corners of an amplifier, each of the corner cleats including a base having mating hook and loop fastener material on the bottom thereof for hooking with the hook and loop fastener material attached to the upper surface of the base, each corner cleat further including upstanding sections perpendicular to each other, along with resilient material thereon, for mating with a cushioning corners of an amplifier to be disposed on the carrier.

7. An amplifier carrier as in claim 6 including a support strap attached to the base for extending over an amplifier thereon for securing the same to the base.

8. An electronic equipment carrier as in claim 6 wherein the base includes at least a pair of grooves in an upper surface thereof for mating with and receiving an associated cover for covering an amplifier to be disposed on the base.

9. An electronic equipment carrier as in claim 8 wherein the base has four grooves for mating with the cover.

10. An electronic equipment carrier as in claim 6 wherein the casters are locking type casters, and the corner cleats comprise four cleats.

11. An electronic equipment carrier for transporting amplifiers, keyboards, or other electronic equipment of different sizes comprising
    a rigid flat base, the base having a thickness and size sufficient for supporting a piece of electronic equipment,
    the base having a plurality of casters attached thereto for allowing the base to be easily rolled,
    a layer of hook and loop fastener material secured to an upper surface of the base thereby forming a flat surface of the material, and
    a plurality of corner cleats removably attachable to the hook and loop fastener material at locations thereon to cradle and support corners of electronic equipment, each of the corner cleats including a base having mating hook and loop fastener material on the bottom thereof for hooking with the hook and loop fastener material attached to the upper surface of the base, each corner cleat further including upstanding sections perpendicular to each other, along with resilient material thereon, for mating with and cushioning corners of electronic equipment to be disposed on the carrier.

12. An electronic equipment carrier as in claim 1 including a support strap attached to the base for extending over electronic equipment thereon for securing the same to the base.

13. An electronic equipment carrier as in claim 1 wherein the base includes at least a pair of grooves in an upper surface thereof for mating with and receiving an associated cover for covering electronic equipment to be disposed on the base.

14. An electronic equipment carrier as in claim 3 wherein the base has four grooves for mating with the cover.

15. An electronic equipment carrier as in claim 1 wherein the casters are locking type casters, and the corner cleats comprise four cleats.

* * * * *